Dec. 15, 1936.  A. H. OLSON  2,064,560
METHOD OF AND APPARATUS FOR ASSEMBLING SPRING STRUCTURES
Filed Oct. 21, 1935    7 Sheets-Sheet 1
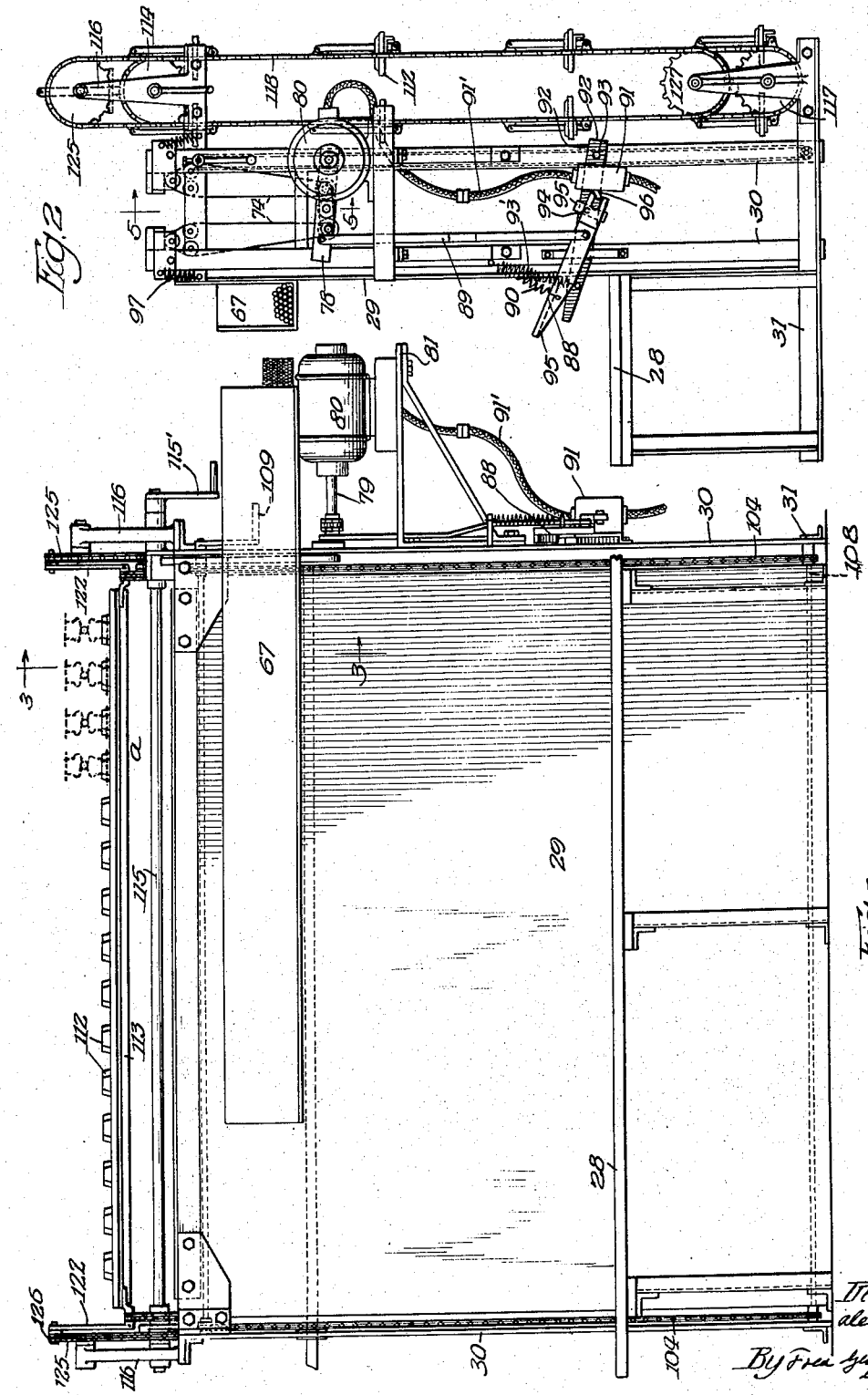

Dec. 15, 1936.  A. H. OLSON  2,064,560
METHOD OF AND APPARATUS FOR ASSEMBLING SPRING STRUCTURES
Filed Oct. 21, 1935  7 Sheets-Sheet 2
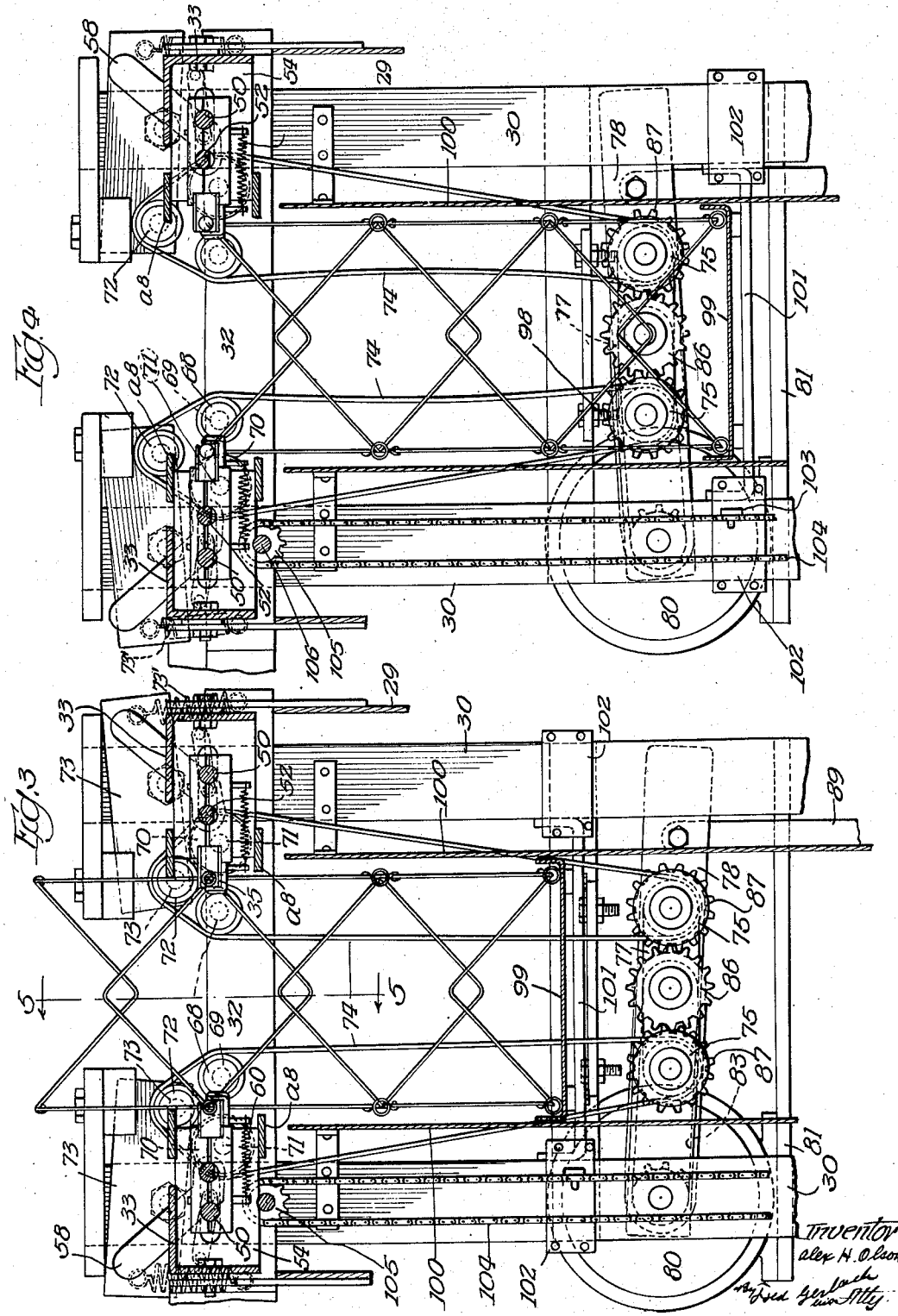

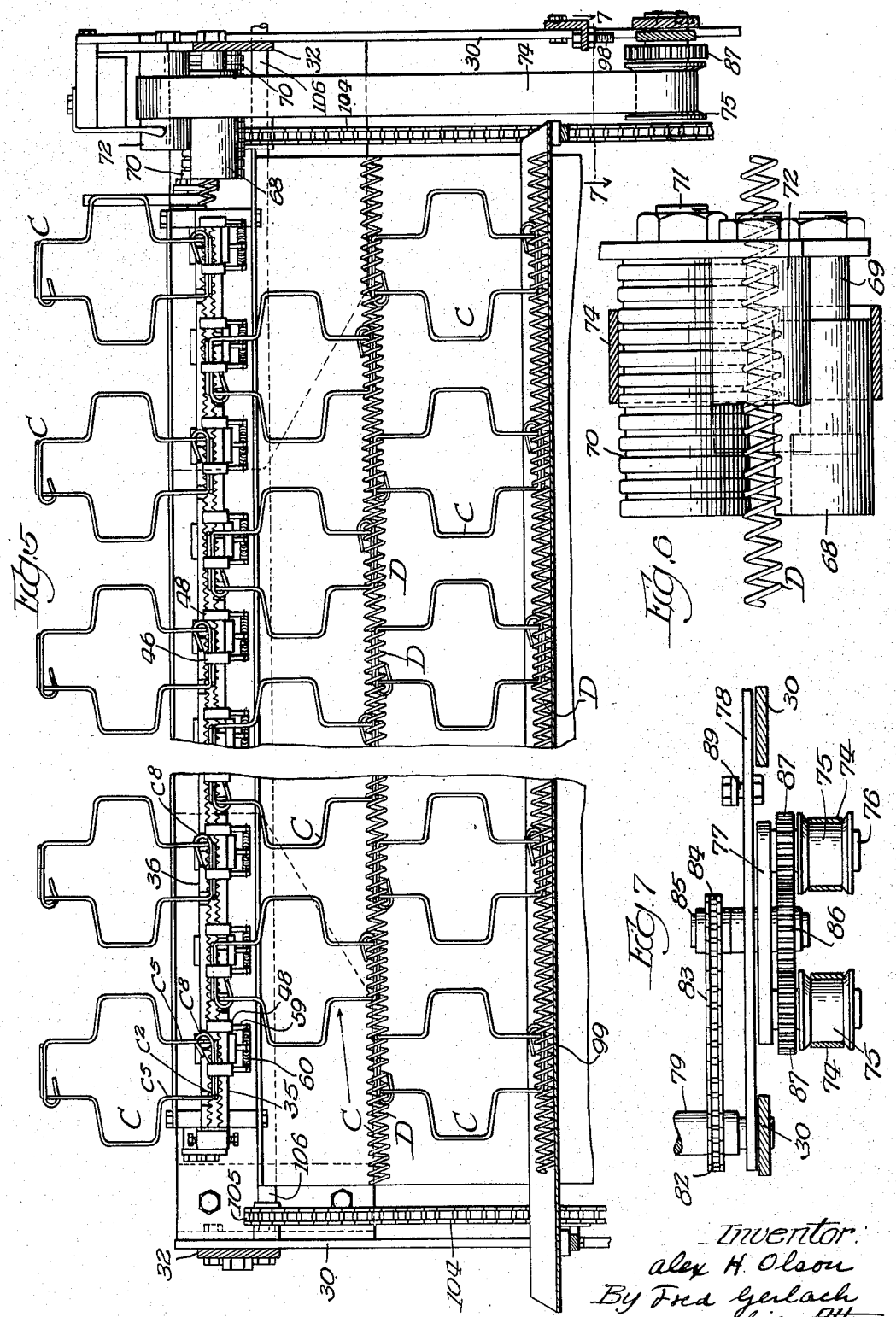

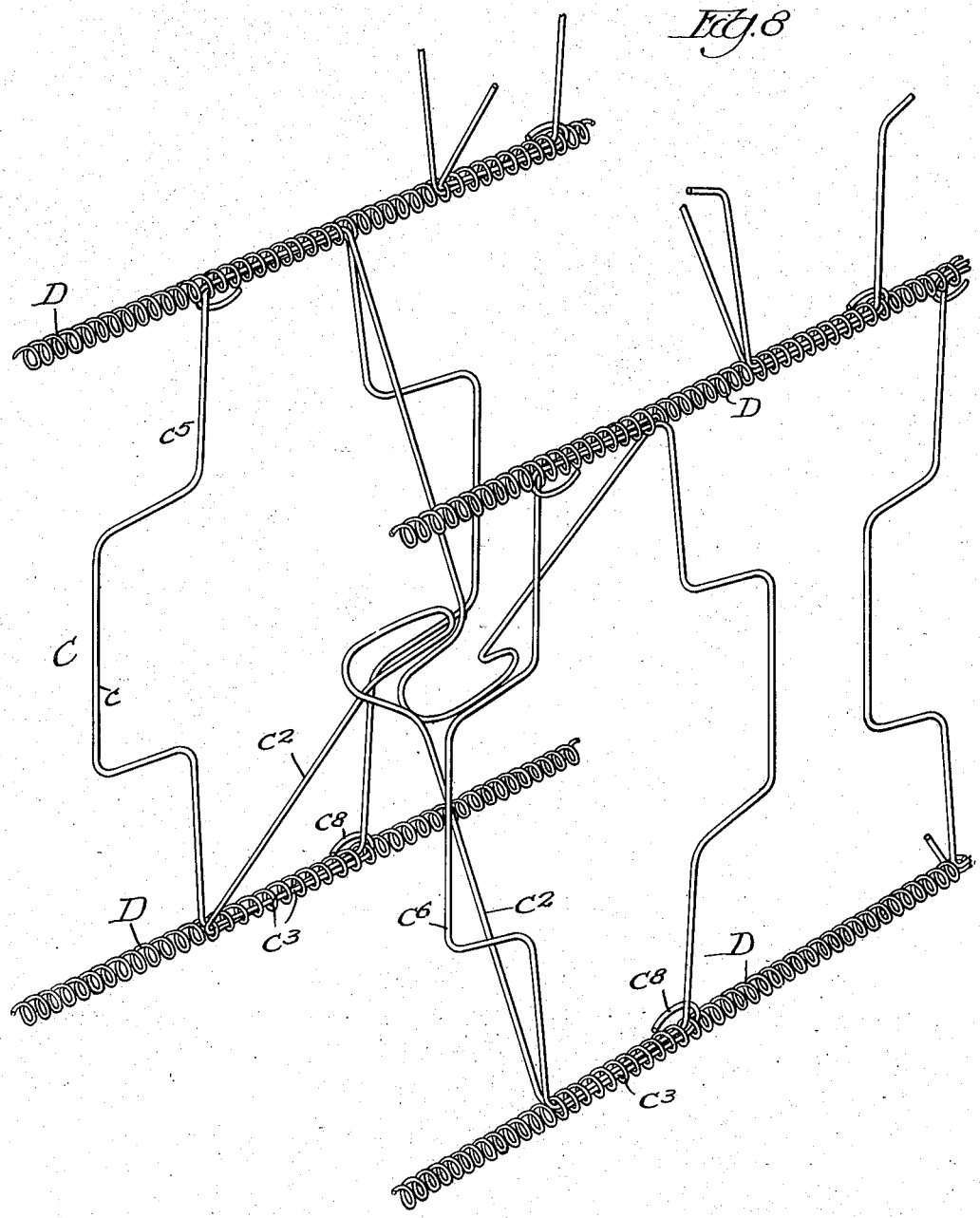

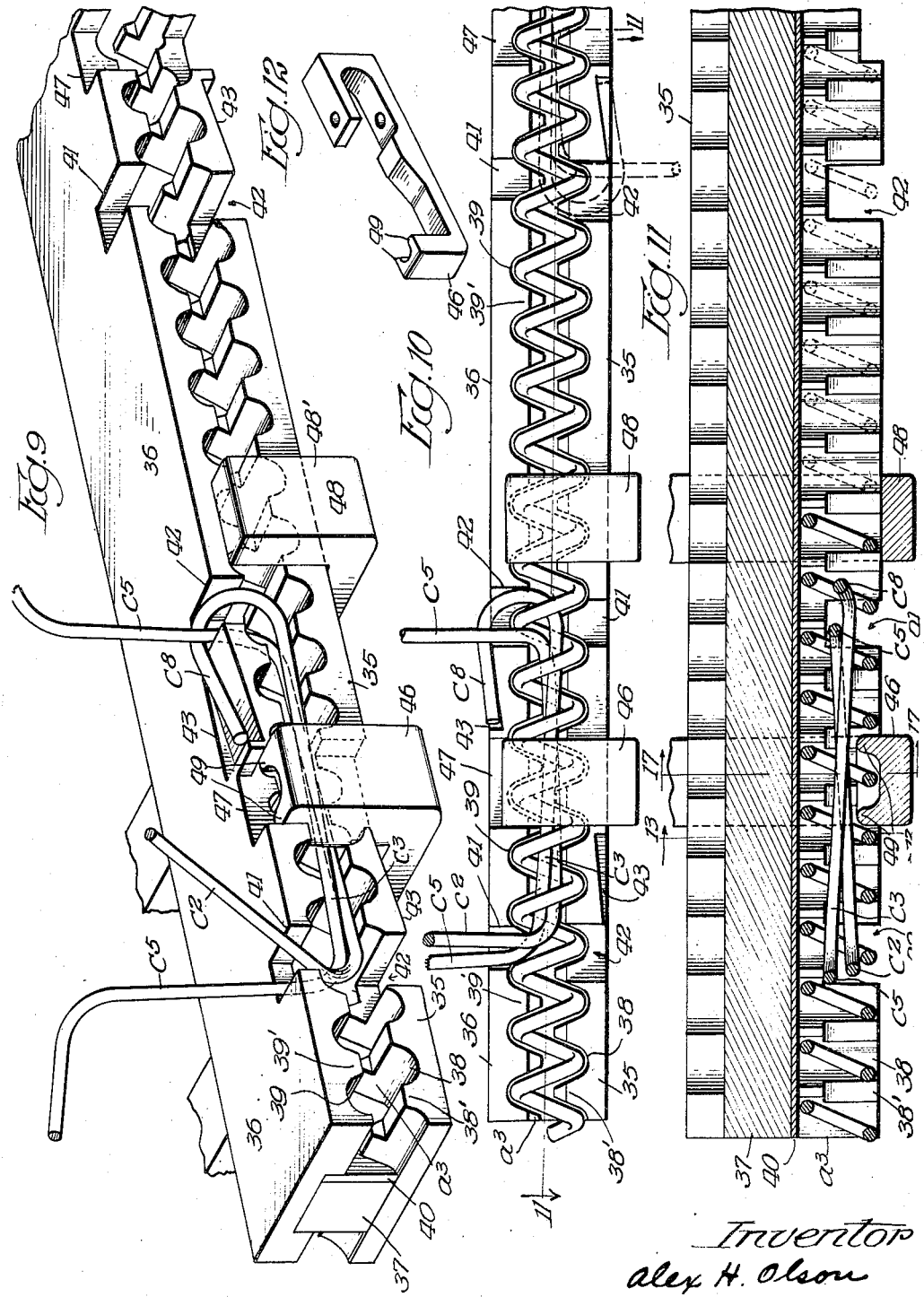

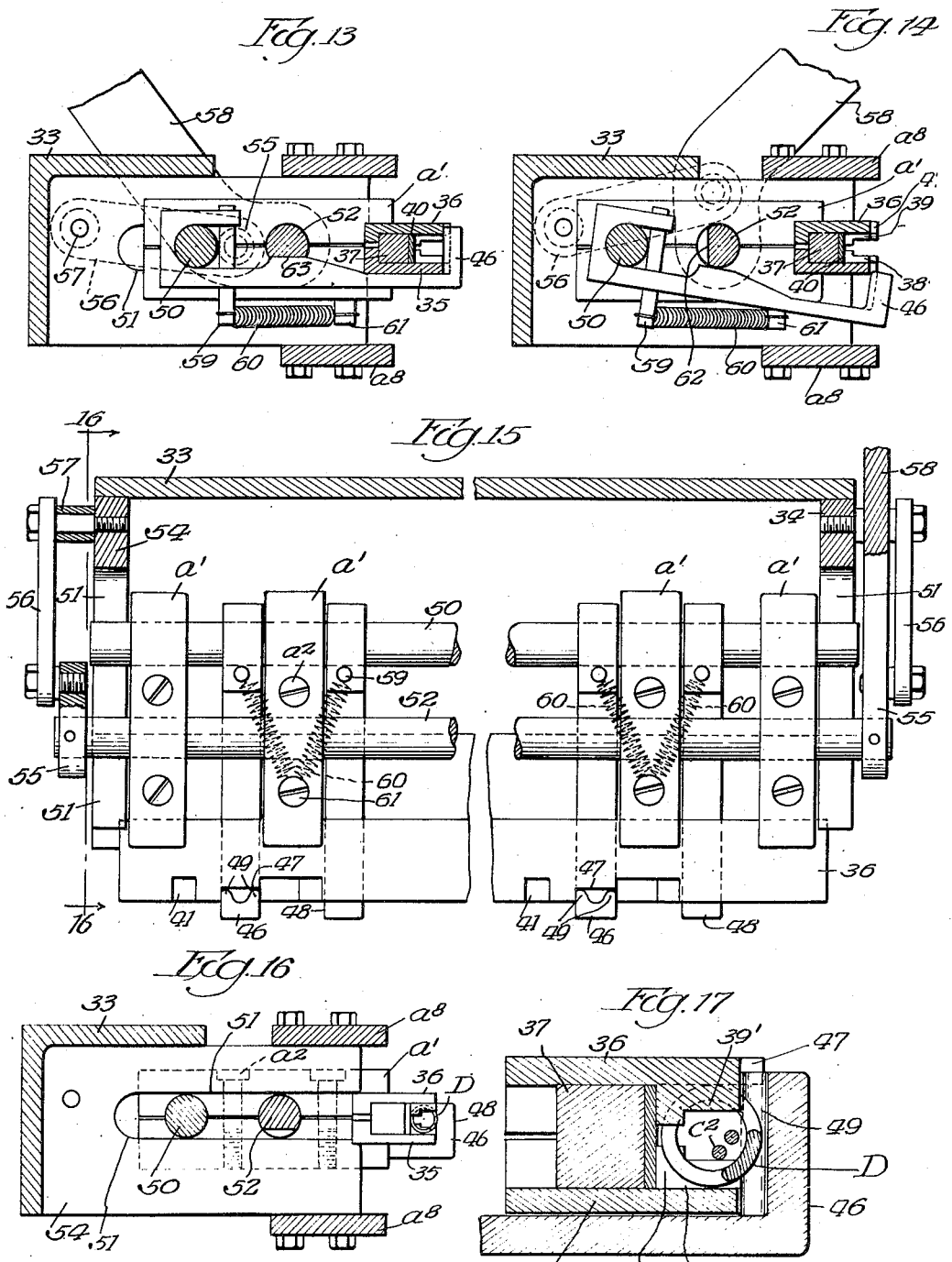

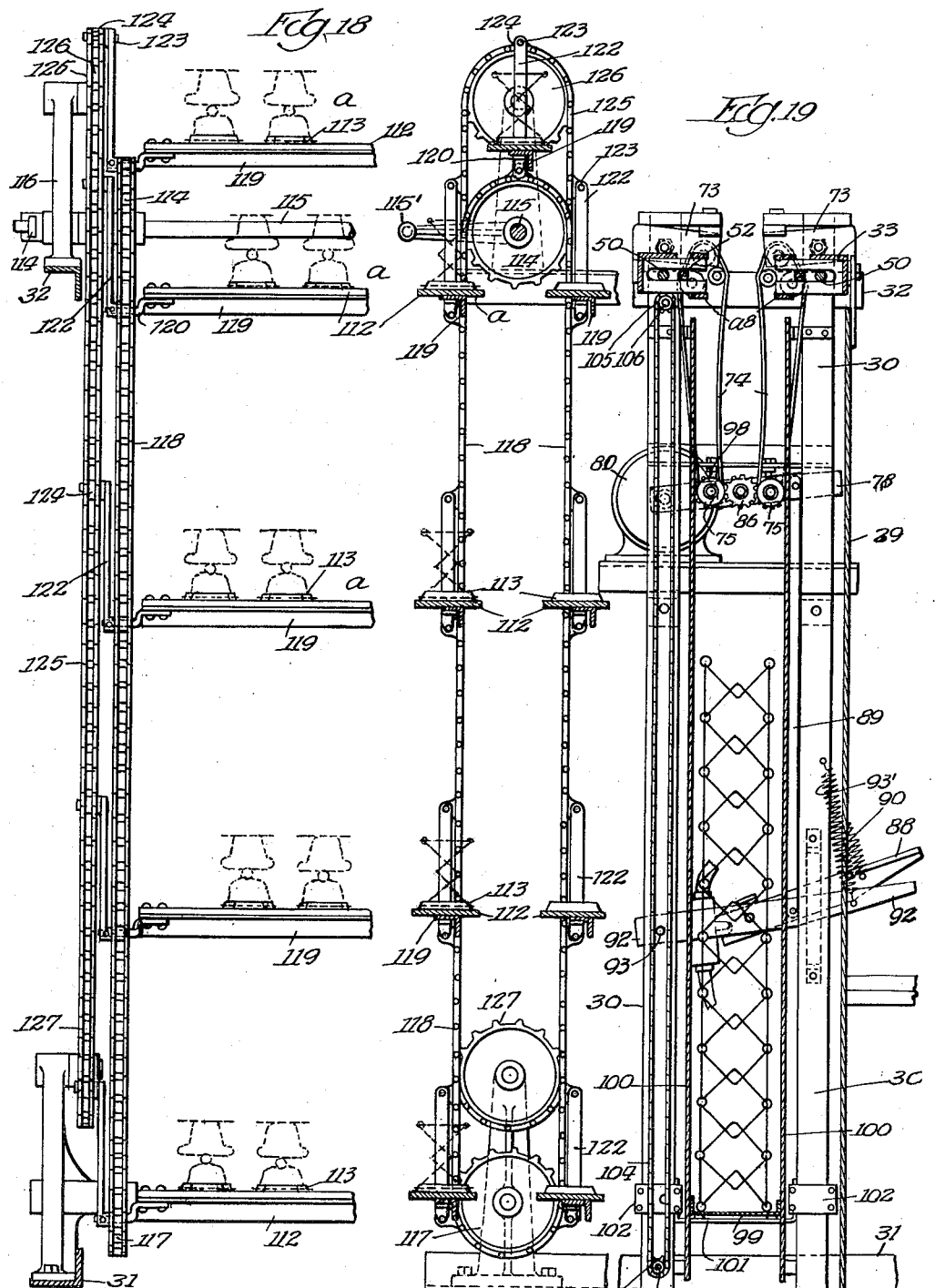

Patented Dec. 15, 1936

2,064,560

UNITED STATES PATENT OFFICE 2,064,560

METHOD OF AND APPARATUS FOR ASSEMBLING SPRING STRUCTURES

Alex H. Olson, Evanston, Ill., assignor to Joseph W. Droll, Chicago, Ill.

Application October 21, 1935, Serial No. 45,915

25 Claims. (Cl. 140—3)

The invention relates to method of and apparatus for assembling spring-structures of the type used for mattresses or beds.

One object of the invention is to provide an improved method of, and apparatus for, assembling spring-structures, composed of rows of springs and helicals.

Another object is to provide apparatus adapted for assembling springs, each composed of separately formed interlocked and mated members with helicals.

Another object of the invention is to provide improved apparatus for lacing helicals around the ends of rows of springs.

A still further object of the invention is to provide a holder, by which ends of springs may be accurately and securely confined while the helicals are being rotated into connected relation therewith.

Another object of the invention is to provide a holder with an open-sided channel for a row of springs and a helical, with latches for confining the helical to the channel and retaining the springs therein.

Another object of the invention is to provide improved apparatus by which the rows of springs will be connected together by weaving helicals between successive rows of springs arranged vertically of one another.

Another object of the invention is to provide improved means for feeding helicals into a holder for a row of springs.

Another object of the invention is to provide improved means for delivering successive rows of springs into position to facilitate their placement into the holders.

Another object of the invention is to provide improved apparatus for assembling the spring-structures set forth in United States Patent No. 2,016,872.

Other objects of the invention will appear from the detailed description.

The invention consists in the several novel features which are hereinafter set forth and are more particularly defined by claims at the conclusion hereof.

In the drawings:

Fig. 1 is a side elevation of a machine embodying the invention; Fig. 2 is an end elevation; Fig. 3 is a transverse section, illustrating the apparatus with several rows of springs assembled and before they are lowered for assembling a succeeding row; Fig. 4 is a similar view, illustrating the assembled rows of springs lowered for assembling the next row of springs; Fig. 5 is a longitudinal section on line 5—5 of Fig. 3; Fig. 6 is a plan of one of the devices for rotating and feeding helicals through the spring-holders; Fig. 7 is a section on line 7—7 of Fig. 5; Fig. 8 is a perspective of a portion of the spring-structure as assembled by the apparatus; Fig. 9 is a perspective on an enlarged scale of a portion of one of the holders for the springs, a portion of one of the springs being shown held therein; Fig. 10 is a front elevation of a portion of one of the holders for the springs with a helical therein; Fig. 11 is a horizontal section on line 11—11 of Fig. 10; Fig. 12 is a perspective of one of the latches for holding the helicals and springs in the holder; Fig. 13 is a transverse section on line 13—13 of Fig. 11, illustrating one of the holders in its operative position; Fig. 14 is a similar view, illustrating the holder retracted to release the springs and helical after an assembling operation; Fig. 15 is a plan of one of the holders and its shifting mechanism; Fig. 16 is a section on line 15—15 of Fig. 15; Fig. 17 is a section on line 17—17 of Fig. 11; Fig. 18 is a side elevation of one end of the mechanism for delivering rows of springs to the assembling mechanism; Fig. 19 is a vertical transverse section through the assembling mechanism and the delivery mechanism for the springs.

In assembling the spring-structure according to the invention, the ends at one side of a row of springs turned from vertical to horizontal position, are placed in a pair of horizontally arranged holders a. These holders are positioned so the springs will extend between them when their ends are placed in the holders, which are provided with longitudinally extending channels and vertically extending notches to receive and retain, respectively, longitudinal and cross-members or portions of the springs. The notches in the holders are spaced apart longitudinally of the holder to correctly space the springs of a row longitudinally as desired in the assembled structure. Helicals are then rotated and advanced in the channels in the holders and around the portions of the springs confined therein until the row of springs has been connected at one side of the turned-over springs. The holders are then operated to release the helicals and springs and the assembly is lowered between the holders to bring the end-portions of the same row of springs into position to be inserted in the holders and the next row of springs, with ends aligned with the first row, are inserted in the holders and notches intermediate the springs of the first row. Helicals are then simultaneously rotated and advanced through the holders to lace the upper ends of the first row and the lower ends of the second row will then be held in the holders, the longitudinally extending portions of one row alternating with those of the other row and properly spaced to be connected together by helicals.

The assembled structure is released from the holders and lowered so that the contiguous ends of the two rows of springs can be held for similar operations until the entire structure has been completed. In this manner the helicals and rows of springs are assembled step-by-step, the assembly being advanced or lowered after each operation.

The lower end of the assembled structure which consists of the helicals and springs at one side thereof, is received and supported by a carrier during these operations and when the structure has been completed, it is removed endwise below the holders to clear the apparatus for the next structure.

The invention is exemplified in assembling a spring-structure (Fig. 8), which comprises rows of springs C and helicals D. Each spring is composed of two wire-members mated and interlocked together. Each member is formed of a single strip of wire bent to form a central spring-loop $c$; upwardly and downwardly extending divergent arms $c^2$; longitudinally extending side-members on the upper and lower arms $c^2$, respectively, adapted to extend longitudinally through the helicals D; cross-members $c^5$ extending from the upper and side-members $c^3$, respectively, formed with off-sets $c^7$ and constituting ties and supports between the adjacent helicals. The terminals of the side-members $c^3$ are each provided with a hook $c^8$ which is adapted to pass around and overlap the cross-member $c^5$ of a mating member to stiffen the spring action and to interlock the mating members together. In assembling the structure, the members of each spring are placed together in mated and interlocked relation before they are placed in the holders $a$ for assembly with the helicals D.

The several mechanisms of the apparatus are supported by a frame, which is built up of standards 30, cross-bars 31, at the lower ends of the standards, upper cross-bars 32, and longitudinal angle-bars 33, all rigidly and suitably secured together. The front side of the frame is closed by a plate 29, which is secured to the standards 30. A platform 28, on which the operator may stand and walk, extends across the front of the frame, so that he can conveniently reach the springs for placement into the holders and the controlling and operating levers for the several mechanisms.

The holders $a$ are horizontally aligned adjacent the top of the frame and spaced apart according to the height of the springs, so that when the longitudinally extending portions at one side of a row of springs which are turned over on one of their sides, and which corresponds to the upper and lower corners thereof, are held in the holders, the springs will extend across or bridge the space between them and will be retained in horizontal position thereby. These holders (Figs. 9–11) are each provided with a channel $a^3$ extending longitudinally therethrough, through which helicals can be advanced and rotated. These channels are open at their confronting faces, so that the longitudinally extending and cross-portions of the springs can be inserted into the holders transversely.

These holders are alike in construction so that a description of one is applicable to both. Each holder is built up of a lower bar 35, a top bar 36 and an intermediate bar 37 to facilitate the manufacture thereof. The bars of the holder are fixedly secured together by split-blocks, or brackets $a'$, between which the bars are clamped by screws $a^2$, which extend through the members of the blocks. A strip or plate 40 of hard metal is fitted against the front face of bar 37, to form a wear-surface at the back of the channel $a^3$ which is engaged by the rotating helical. The upper face of the bottom bar 35 is provided with transverse grooves 38, between ribs 38'. The lower face of the upper bar 36 is formed with similar transverse grooves 39, between ribs 39'. The grooves and ribs of the upper and lower bars are staggered to form a guideway for the helical and to individually guide and control the coils of the rotating helical in the channel $a^3$. These ribs and grooves, together with the back face-plate 40 in the channel $a^3$ constitute means for confining and guiding a helical so it will travel in a helical path through the channel $a^3$. The ribs 38', 39' are cut away to adapt the channel $a^3$ to receive the lapping side-members $c^3$ of the springs through the open side of the channel. At intervals, corresponding to the desired spacing between the springs, the holder is provided with means for receiving, in properly spaced relation, the cross-members $c^5$, arms $c^2$ and hooks $c^8$ of the springs which extend upwardly or downwardly from the longitudinally-extending side members $c^3$ in the channel $a^3$. The provision for this purpose for each spring of a row comprises a notch 41 in the outer face of upper holder-bar 36 to receive the divergent spring-member $c^2$ and the cross-member $c^5$ at one end of the lapped side-members $c^3$ placed in the channel $a^3$ and a notch 42 in the outer face of said bar to receive the cross-member $c^5$ and the outer portion of the hook $c^8$ at the other end of the longitudinally-extending members $c^3$. The top of bar 36, at each notch 42, is recessed at 43 to receive the inner end of the hook and hold it above and outside of the channel $a^3$. These notches 41, 42 in the bar adapt the holder to receive the lower portions of the springs. The lower holder-bar 35 is provided with similar pairs of notches 41, 42, and recesses 43, to receive lapped members $c^3$ at the upper ends of a row of springs. These pairs of notches are provided in sufficient number in each holder so that the springs of alternating rows may be staggered, as shown in Fig. 8.

The notches 41, 42 serve to position the cross-members $c^5$, outer portion of hook $c^8$, and arms $c^2$, with respect to the coils of the helicals, so that the rotary and longitudinally advancing end of the coil will clear them and pass freely through the channel. Preferably, the notches are arranged with respect to the transverse ribs and grooves in the holder, so that a coil of the helical will pass between the outer end of the hook $c^8$ and the adjacent cross-member $c^5$ of a spring. The construction shown exemplifies one by which the members of the spring which extend from the longitudinal side-portions, will be accurately positioned with respect to the individual coils of the helical to insure the travel of the helical around the members $c^3$ and to clear the members extending upwardly and downwardly therefrom.

By reason of the provisions of these notches upon and below the channels $a^3$, the holders are adapted to retain and space the springs of an end row of the structure and also adjacent contiguous rows of springs. These notches in the channel, having an open face, permit the springs to be inserted laterally into the holders.

In order to hold the longitudinal extending portions $c^3$ of the springs in the central portion of the channel $a^3$ so they will be disposed inside of the coils of the helical and to confine the helical to the channel and prevent its deflection through the open side thereof, latches 46 and 48 are provided. Latches 48 have upstanding members 48' which extend across the open side of channel $a^3$ of the holder and prevent displacement of the helical through said open side. Latches 46 also extend across the open side of the channel $a^3$ and are provided with vertical ribs 49 (Figs. 9, 11) which extend into notches 47 in the side of the holder-bars 35, 36, so that their inner vertical edges will hold the spring-members $c^3$ seated on the ribs 38' and backwardly in the groove, where the coils of the helical will pass around them. The helical passes between the ribs 49. The latches 46 and 48 are spring-pressed in their operative position (Fig. 9) and can be pressed downwardly by the operator so they will clear the open side of the channel $a^3$ for insertion of the springs into the holder. Latches 46 and 48 are also depressed by mechanism hereinafter described when the assembled helical and springs are to be released.

The holders $a$ are horizontally movable so they may be spread apart to release the assembled helicals and springs through the open sides of the channels $a^3$ and reset into operative position after the assembled helicals and springs have been moved downardly below the holders. A shaft 50 extends longitudinally through all of the blocks $a'$ of the holder and is clamped between the members of said blocks which carry the holder-bars 35, 36. The ends of shaft 50, and of the bars 35, 36 are guided horizontally in slots 51 (Fig. 16) which are formed in brackets or blocks 54, which are rigidly secured to the angle-iron frame-bars 33. A shaft 52 also extends through, and is journaled in, the blocks $a'$. The ends of shaft 52 extend through and are guided in the slots 51. At each end, shaft 52 has keyed thereto an arm 55, which is connected by a link 56 to a stud 57 on the outer side of bracket 54. One of the arms 55 is provided with a handle or lever 58. When the operator swings the lever 58 from the position shown in Fig. 13 to that shown in Fig. 14, the arms 55 and link 56 will be operated to slide the holder away from the assembled helical and springs. When the arm is reversely shifted, the holders $a$ will slide into operative position (Fig. 1). While the lever 58 is in position shown in Fig. 13, the holder will be locked in its operative position by the links 56. Bars $a^8$ are fixed to the brackets 54 above and below the holders. These bars serve as stationary abutments for the springs while the holders are being shifted to release the helicals and springs.

Each of the latches 46, 48 is pivoted on the shaft 50, being held thereon by a pin 59. A spring 60 between each pin 59 and a stud 61 projecting downwardly from one of the blocks $a'$ yieldingly holds the latch in its operative position. Shaft 52 is provided with a flat or cam surface 62 for engaging a surface 63 on the latches 46, 48 of the holder. When the lever 58 is swung from its normal position (Fig. 13), the cam 62 on shaft 52 will initially depress the latches of the holder to clear the open side of the channel $a^3$ therein for the withdrawal of the holder from the assembled helical and spring, as shown in Fig. 14. These latches are thus mounted to reciprocate with the holder and so that they will be conjointly shifted into and out of operative position therewith. When the lever 58 is returned to its normal position, the holder will slide to its operative position and the latches will be simultaneously restored, by springs 60, to position to close the open side of the channel $a^3$.

Mechanism is provided for rotating and feeding helicals into the holders. The helicals are pre-formed, and a supply of them is held in an elongated, open-top box 67, (Figs. 1 and 2), which is mounted on the supporting frame of the apparatus at one side thereof. A set of three rolls (Figs. 4 and 6), into the grip of which the operator places the front end of the helical, is provided at the end of each holder $a$. Each set of rolls comprises a lower plain-faced roll 68, which is journaled on a stud shaft 69 which is stationarily mounted in the supporting frame; an annular grooved roller 70, similarly mounted on a fixed shaft 71, and an upper roller 72, which is mounted on a shaft which is carried by a lever 73, so that it will be lowered to engage the helical and press it against the peripheries of the lower rolls 68 and 70 to cause the helical to be gripped. Springs 73' normally hold the levers 73 raised. Each set of rolls 68, 70, 72 is driven by an endless belt 74, which engages the outer side portions of rolls 68 and 70 and extends over roll 72 and around a drive-pulley 75.

The drive pulleys 75 for the belts 74 are journaled on stub-shafts, which are carried by a rocker-lever 77. Gears 87, fixed to the pulleys 75, respectively, mesh with a central pinion 86 on a shaft 85, which extends through rocker-lever 77 and is carried by a lever 78. Shaft 85 is driven to drive gears 86, 87 by a sprocket 82 on the shaft 79 of an electric motor. A chain 83 is driven by sprocket 82 and a sprocket 84 fixed to shaft 85. Lever 78 is pivoted concentrically with the shaft 79 so that it can be depressed to lower shaft 85, rocker-lever 77 and pulleys 75 to draw the belts downwardly and force the upper rolls 72 into position to press against the helicals so it will be rotated and advanced when the belt is driven. The rocker-lever produces an equalized pull on the belts 74. A pedal 88 (Figs. 2 and 19) is connected by a link 89 to a distal end of lever 78. A spring 90 is applied to pedal 88 to normally hold it in its raised position. An electric switch 91 for controlling the operation of the motor 80, is mounted on a lever 92, which is pivoted to the frame at 93 and is held normally raised by a spring 93'. Pedal 88 is pivoted at 94 to lever 92 and is provided with a laterally projecting abutment or flange 95, which is adapted to engage the top of the free end of lever 92. Pedal 88, at its inner end, is provided with a fork for shifting the switch-trigger 96, which projects from the casing of switch 91, which is connected to the motor by a conductor-cable 91'.

When the operator has inserted the ends of the helicals into the two sets of rollers, respectively, he will depress the pedal 88 which, during its initial movement, will shift the switch-trigger 96 to close the switch, and cause the motor 80 to operate. As the pedal is depressed, flange 95 will abut against lever 92, so that lever 92, which carries the switch and pedal 88, will swing downwardly together. This will operate link 89 downwardly to swing lever 78 downwardly. This downward swing of lever 78 will move the shaft 85 and the rocker 77 downwardly, so that pulleys 75 will pull the belts 74 downwardly a sufficient distance to force the roll 72 against the helicals and to cause the belts to frictionally grip and rotate rolls 72, 70 and 68. The helicals will then be rotated on their own axes and the annular grooves in roll 72 will feed the helicals forwardly into and through the holders $a$ until the rear ends of the helicals pass off the rolls and the helicals have been wound around all of the springs in the holders. The operator will then release pedal 88 so that the pedal 88 will be lifted by its spring 90 and will shift the switch-trigger 96 to stop the motor. Spring 93' will lift lever 93, and springs 73' will swing levers 73 to raise rolls 72 to their inoperative position. Adjustable stops 98 are adapted to engage rocker 77 to limit its upward movement.

After each row of springs has been connected by helicals and released from the holders, the assembled helicals and springs are lowered between the holders to bring the other sides of the spring into position to be inserted into the holders. For this purpose a vertically reciprocable carrier 99 is provided. This carrier is slidable between stationary fixed vertical plates 100, between which the spring-structure can be lowered. Carrier 99 is carried by cross-bars 101, the ends of which are secured to brackets 102, which are vertically slidable on frame-standards 30. The brackets 102 at one side of the table are secured, as at 103, to endless sprocket-chains 104. The upper ends of these chains extend around sprockets 105 on a longitudinal shaft 106 which is journaled in the supporting-frame and their lower ends extend around idler sprockets 107 on a longitudinal shaft 108. A crank-handle 109 is secured to one end of the upper shaft 106 which, when rotated, will operate the chains 104 to raise or lower the carrier 99, as desired. After the first pair of helicals has been wound around the ends of the first row of springs, the carrier 99 will be lowered so that when the springs and helicals are released from the holders $a$ they will be in position to hold the upper ends of the springs in horizontal alignment with the channels in the holders, and in convenient position for insertion into the holder. When the next row of springs and helicals has been connected to the structure, and the helicals released from the holders, the carrier 99 will be again lowered into position to bring the upper ends of the springs into horizontal alignment with the holders for the next assembling operation. The carrier may thus be lowered step-by-step until the desired number of rows of springs has been connected by helicals to form a spring-structure of the desired width. One end of the supporting frame is open so that when the structure has been completely assembled, it can be removed endwise from the carrier.

Mechanism is provided at the rear side of the assembling apparatus for delivering rows of springs composed of previously interlocked and mated members within reach of the operator, so they can be expeditiously and conveniently placed in spaced relation into the holders $a$. This mechanism consists of a series of longitudinal bars 112, each provided with a series of blocks 113 for positioning the springs correspondingly to their spacings in the holders. These bars are carried by a series of endless chains, whereby they may be successively elevated into position adjacent the holders and lowered for reloading. This equipment comprises a pair of sprockets 114 adjacent the ends of the machine and fixed to a longitudinal shaft 115, which is journaled in stationary bearings 116; a pair of lower idler sprockets 117 and endless chains 118 around each pair of sprockets 114, 117. A crank 115' is fixed to one end of shaft 115, for driving the sprockets 114 to simultaneously operate the chains 118. Each spring-carrying bar 113 is fixed to an angle-iron 119, which has rigidly fixed to its ends, pins 120, which extend through, and are pivotally held on, links of chain 118. Each pin 120 extends through one of said links and is fixed to an upstanding link 122. The upper end of each link 122 carries a pin 123, which extends into an ear 124 on one of the links of a sprocket chain 125, which is trained around, and passes between, an upper idler sprocket 126 and a lower idler sprocket 127. The sprockets 114 and 117 of the inner chains 118 are disposed below the sprockets 126, 127, respectively, so that the links 122 will travel vertically as the chains pass around the upper portions of the upper sprockets and the lower portions of the lower sprockets, to cause the spring-carrying bars 112 to travel horizontally at all times. As each loaded bar 112 reaches its uppermost position, the springs thereon will be within convenient reach of the operator for placement into the holders $a$. During the ascent of the bars 112, the springs will be placed on the blocks 113. After the springs from the uppermost bar have been unloaded into the holders, the operator will rotate crank 115' to bring the succeeding loaded bar into position for the succeeding operation. The blocks 113 on alternating bars 112 will be relatively staggered, so that each spring will be positioned substantially in transverse alignment with its position in the assembled structure in which the springs of each row are intermediate the springs of the contiguous rows. This exemplifies mechanism for delivering springs composed of interlocked mated members in rows, into position for corresponding placement in the holders for each assembling operation.

The method of assembling and operation of the apparatus will be as follows: the members of the springs will be mated and interlocked, and placed in rows upon bars 112 of the delivery mechanism. The operator will rotate crank 119 to bring one of the loaded bars 112 to the top of the delivery mechanism and into position adjacent the holders $a$. Normally, the holders $a$ will be set into their operative position so the springs will span the space between them. The row of springs on said bar 112 will then be turned on their sides and the longitudinal members $c^3$ will be placed in the channels $a^3$ of the holders with the upwardly extending cross-members $c^5$ extending upwardly through notches 41, 42 and the hook $c^8$ in the recesses 43 of the upper bars 36 of the holders. These springs will be placed in the alternate pairs of notches in the holders. During this placement, latches 46 will be pressed downwardly to permit the longitudinal members $c^3$ of the springs to be inserted laterally through the open sides of and into the channels $a^3$. The springs will then be correctly spaced apart and held against longitudinal movement with the member $c^3$ centrally disposed in the channels a³. The operator will place helicals in the sets of feed-rolls 68, 70, 72 with the coils thereof in the annular grooves in roll 70 and depress the pedal 88, which will conjointly close the switch 91 and start the electric motor 80 and swing lever 92 downwardly to lower lever 78 through link 89. This will shift the rocker-lever 77 downwardly to cause the pulleys 75 to move downwardly. The belt 74 will be pulled downwardly by pulleys 75 to lower rolls 72 against the force of the springs 73' applied to levers 73 so that the helicals will be grasped by the rolls and rotated and advanced as the belts are driven. When the ends of the helicals have passed beyond the feed-rolls, the operator will release the pedal 88 and this will stop the motor and release belt 74 so the feed rolls 72 will be inoperative. The operator will then turn crank 109 to bring the carrier 99 into position to support the assembled helicals and springs in position to bring the longitudinal member c³ at the upper sides of the springs of the first row into alignment with the channels a³ of the holders. Levers 58 will be shifted from operative position (Fig 13) to the position shown in Fig. 14, which will simultaneously shift the latches 46, 48 to clear the open sides of the channels a³ and retract the holders so that the assembled helicals and springs will be free to be lowered between the holders. The assembled springs and helicals will rest on the carrier 99 and after the holders have been returned to their respective position, the longitudinal portions c³ of the springs will be placed into the holders, with the cross-members c⁵ and arms c² extending through the notches 41, 42 in the lower bars 35 of the holders. The longitudinal members c³ of another row of springs will then be placed in the holders with their cross-members and arms extending upwardly through the notches in the top-bar 36 in the pairs of notches intermediate those in which the springs of the first row are held. Another pair of helicals will then be rotated and fed into the holders in the manner previously described and the operations repeated until the entire structure has been assembled. As each row of springs is assemled, the carrier 99 is lowered. When the entire structure has been assembled, it will be pushed endwise through the clear space between plates 100 and removed for assembling the next structure.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In apparatus for assembling spring-structures, the combination of a holder provided with a longitudinal channel having an open side for receiving longitudinally extending portions of a row of springs, means for receiving cross-members of the springs, and a series of transverse guides in the channel for individually directing the coils of a helical around the cross-members of the springs, and means for rotating the helical in, and advancing it through, the channel.

2. In apparatus for assembling spring-structures, the combination of a holder provided with a longitudinal channel having an open side for receiving longitudinally extending portions of a row of springs, notches for receiving cross-members of the springs and hooks on the outside of the channel, and a series of transverse guides in the channel for individually directing the coils of a helical around the cross-members of the springs and through the hooks, and means for rotating the helical in, and advancing it through, the channel.

3. In apparatus for assembling spring-structures, the combination of a holder composed of a pair of bars with a channel between them having an open side for receiving longitudinally extending portions of a row of springs, means for receiving cross-members of the springs, and transverse guides in the channel for directing the coils of the helicals around portions of the springs, a wear strip in the back of the channel, and means for rotating a helical in, and advancing it through, the channel.

4. In apparatus for assembling spring-structures, the combination of a holder provided with a longitudinal channel having an open side for receiving longitudinally extending portions of a row of springs, notches for receiving cross-members of the springs extending in opposite directions from the channel for the cross-member in two rows of springs, means for individually directing a helical around the cross-members, and means for rotating the helical in the channel and around the cross-members of two rows of springs.

5. In apparatus for assembling spring-structures, the combination of a pair of holders provided with channels for receiving, respectively, helicals endwise and longitudinal portions at the opposite ends of one side of a row of springs, and means for feeding helicals through, and around the portions of the springs in, the channels, each holder having oppositely extending notches for receiving cross-members, cross-portions at contiguous sides of two rows of springs, the holders being spaced apart to permit the assembled helicals and springs to pass through the space between them so that helicals can be wound around the longitudinal portions of the two rows of springs held in the channels.

6. In apparatus for assembling spring-structures, the combination of a pair of holders, spaced apart for receiving a row of springs between them, and provided with channels for receiving, respectively, end-portions of the springs, means for feeding helicals through, and around the portions of the springs in, the channels, said holders being separable to release the assembled helicals and springs, latches for holding the helicals in the channels, and means for shifting the latches to release the assembled helicals and springs.

7. In apparatus for assembling spring-structures, the combination of a pair of holders, provided with channels having confronting open sides for receiving, respectively, end-portions of a row of springs, means for feeding helicals through, and around the portions of the springs in, the channels, the holders being spaced apart horizontally to provide a space between them, across which the springs extend, and a carrier below the holders for the assembled springs and helicals, movable vertically to position the upper portions of successive rows of springs for assembly with helicals in the holders.

8. In apparatus for assembling spring-structures, the combination of a pair of holders, provided with channels having confronting open sides for receiving, respectively, end-portions of a row of springs, means for feeding helicals through, and around the portions of the springs in, the channels, the holders being spaced apart horizontally to provide a space between them, across which the springs extend, and a carrier below the holders for the assembled springs and helicals, movable vertically to successively position the upper end of the upper portions of each row of springs for assembly with helicals in the holders, said holders being separable to release the assembled springs and helicals.

9. In apparatus for assembling spring-structures, the combination of a holder provided with a channel for receiving end-portions of a row of springs, mechanism for rotating and feeding a helical through the channel and around the springs comprising a series of three rolls arranged to grasp a helical between their peripheries, one of the rolls being movable to and from the other two rolls, an endless belt extending around the rolls, a motor for driving the belt and means for conjointly shifting the belt and the movable roll to grasp a helical and controlling the motor.

10. The combination with an apparatus for assembling spring-structures, comprising rows of springs and helicals comprising a holder, of mechanism for delivering rows of springs to the holder, comprising a series of bars, each adapted to retain a row of springs upright thereon, and means for shifting the bars to successively bring them into position for placement into the holder.

11. The combination with an apparatus for assembling spring-structures, which comprises rows of springs and helicals, of mechanism for delivering rows of springs to the apparatus, comprising endless chains, a series of bars on the chains, each bar adapted to retain a row of springs thereon, and means for shifting the bars to successively bring them into delivery position.

12. That improvement in assembling spring-structures, which consists in placing two rows of springs to extend between, and with contiguous end-portions at their sides in, a pair of holders, coiling helicals around the end-portions of the springs in the helicals, moving the helicals with the spring-portions therein out of and away from the holders, and repeating the operation until the entire structure has been assembled.

13. That improvement in assembling spring-structures, which consists in placing a row of springs to extend between, and with opposite end-portions at one side of a row of springs in, a pair of holders, coiling helicals around the end-portions of the springs in the helicals, moving the helicals with the spring-portions therein out of and away from the holders, placing the end-portions at the other side of said row and portions of a second row of springs in holders, coiling helicals around the end-portions of the two rows of springs in the holders, and repeating the operation until the entire structure has been assembled.

14. In apparatus for assembling spring structures, the combination of a holder provided with a channel having an open side for receiving end portions of a row of springs, means for feeding a helical through and around the portions of the springs in the channel, and latches extending across the open side of the channel for retaining the helical in the channel, the latches having grooves to receive, and ribs to extend between, the coils of the helical.

15. In apparatus for assembling spring structures, the combination of a holder provided with a channel having an open side for receiving end portions of a row of springs, means for feeding a helical through and around the portions of the springs in the channel, and latches extending across the open side of the channel, the latches having ribs to extend between the coils of the helical and hold the springs in the channel, and grooves between the ribs to receive and guide the coils of the helical.

16. In apparatus for assembling spring structures, the combination of a holder provided with a channel having an open side for receiving portions of a row of springs, means for feeding a helical through and around portions of the springs in the channel, and latches extending across the open side of the channel, carried by the holder and provided with means for retaining the spring-portions in the channel, the holder having notches in its channelled face, into which the latches extend.

17. In apparatus for assembling spring structures, the combination of a holder provided with a channel having an open side for receiving end portions of a row of springs, means for feeding a helical through and around portions of the springs in the channel, and latches extending across the open side of the channel, carried by the holder, for retaining the helical in the channel, the holder having notches in its channelled face into which the latches extend, the latches having ribs to extend between and intermediate grooves to receive the coils of the helical.

18. In apparatus for assembling spring structures, the combination of a movably supported holder provided with a channel having an open side for receiving portions of a row of springs, means for feeding a helical through and around end-portions of the springs in the channel, a series of latches extending across the open side of the channel, carried by and movable with the holder and provided with means for retaining the spring-portions in the channel, the latches being separately and manually releasable to permit the spring-portions of one row to be inserted in the channel while the spring-portions of another row are held in the channel.

19. In apparatus for assembling spring structures, the combination of a slidably supported holder provided with a channel having an open side for receiving portions of a row of springs, means for feeding a helical through and around portions of the springs in the channel, and a series of latches extending across the open side of the channel, carried by, and slidable with, the holder and provided with means for retaining the spring portions in the channel, the latches being separately and manually releasable to permit the spring portions of one row to be inserted in the channel while the spring portions of another row are held in the channel, and means for slidably shifting the holder to and from the springs and simultaneously shifting the latches into or out of their operative position across the channel.

20. In apparatus for assembling spring structures, the combination of a holder having a side face with an open channel for receiving springs, the holders being provided with notches above and below the channel for receiving end portions of alternating staggered contiguous rows of springs, means for releasably holding the end-portions of the springs in the notches, and means for feeding a helical through and around the end-portions in the channel.

21. In apparatus for assembling spring structures, the combination of a pair of holders spaced apart horizontally, having confronting side faces with open channels for receiving opposite ends of springs, each of the holders being provided with notches above and below the channel for receiving end-portions of alternating staggered contiguous rows of springs, means for releasably holding the spring-portions of springs in the notches, and means for feeding helicals through and around the spring-portions in the channels.

22. In apparatus for assembling spring structures, the combination of a pair of holders arranged side-by-side and spaced apart horizontally to receive, respectively, spring-portions at the opposite ends of a row of springs and supported with a vertically extending space between them to permit assembled springs to be lowered vertically, the holders having confronting side faces with open channels for receiving and holding said spring portions, and means for feeding helicals around the spring portions in the channel.

23. In apparatus for assembling spring structures, the combination of a pair of horizontally movable holders arranged side-by-side and spaced apart horizontally to receive, respectively, spring-portions at the opposite ends of a row of springs and supported with a vertically extending space between them to permit assembled springs to be lowered vertically, the holders having confronting side faces with open channels for receiving and holding said spring-portions, and means for feeding helicals around the spring-portions in the channel.

24. In apparatus for assembling spring-structures, the combination of a pair of slidable holders each provided with a channel having an open side for receiving opposite end portions of a row of springs, stationary supporting guides for the holders, means for feeding helicals through and around the end portions of the springs in the channels, a series of latches carried by and slidable with the holders, respectively, and provided with means for retaining the spring-portions in the channels, and means for slidably shifting the holders and swinging the latches to clear the channels for withdrawal from the helicals and springs, the latches being separately and manually releasable to permit the springs of one row to be inserted in the channels while the spring-portions of another row are held in the channel.

25. In appartus for assembling spring structures, the combination of a pair of horizontally slidable holders, each provided with a channel having an open side for receiving opposite end portions of a row of springs, stationary supporting guides for the holders spaced apart horizontally to permit an assembled structure to be lowered between them, means for feeding helicals through and around end portions of the springs in the channels, a series of latches carried by and slidable with the holders, respectively, and provided with means for retaining the spring-portions in the channels, and means for slidably shifting the holders and swinging the latches to clear the channels for withdrawal from the helicals and springs, the latches being separately and manually releasable to permit the springs of one row to be inserted in the channel while the spring-portions of another row are held in the channel.

ALEX H. OLSON.